Figure 1:
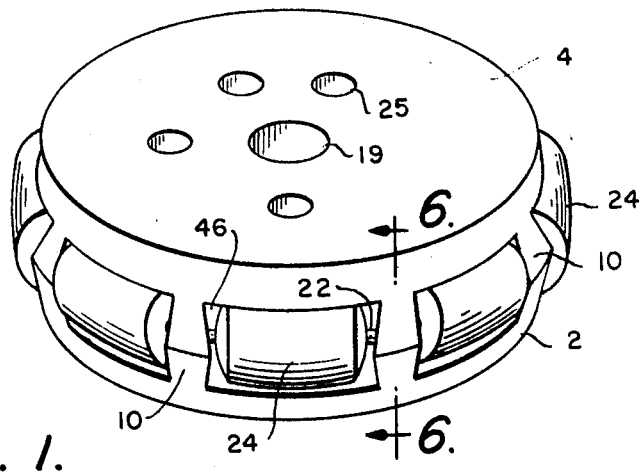

United States Patent

[11] 3,590,970

| [72] | Inventor | Andrew T. Kornylak |
| | | Hamilton, Ohio |
| [21] | Appl. No. | 782,038 |
| [22] | Filed | Dec. 9, 1968 |
| [45] | Patented | July 6, 1971 |
| [73] | Assignee | Kornylak Corporation |
| | | Hamilton, Ohio |

[54] CONVEYOR ROLLER
22 Claims, 12 Drawing Figs.

[52] U.S. Cl. .................................................. 193/37,
193/35
[51] Int. Cl. .................................................. B65g 13/00
[50] Field of Search ...................................... 193/35, 36, 37

[56] References Cited
UNITED STATES PATENTS

| 2,528,116 | 10/1950 | Clemson | 193/37 |
| 2,858,000 | 10/1958 | Ohnstad | 193/37 |
| 3,016,127 | 1/1962 | Cooper | 193/37 |
| 3,363,735 | 1/1968 | Hotchkiss | 193/37 |
| 3,400,988 | 9/1968 | Hudson et al | 193/37 |
| 3,416,638 | 12/1968 | Buck | 193/37 |

*Primary Examiner*—Andres H. Nielsen
*Attorney*—Harold L. Halpert

ABSTRACT: A conveyor roller comprising a hub and a plurality of rollers mounted in the periphery of the hub. In some forms of the invention the hub is divided into two segments on one or more planes normal to the axis of rotation. The segments are contoured to define bearings and pockets for the mounting of the rollers when secured together. In other forms of the invention the hub is divided into three segments on two or more planes normal to the axis of rotation. The segments are contoured to define bearings and pockets for the mounting of the rollers when secured together. The rollers are arranged in parallel planes and are circumferentially staggered to provide a continuous support for the load. The hub members and rollers are preferably formed by moulding of synthetic plastics.

INVENTOR
ANDREW T. KORNYLAK

BY Harold L. Halpert

AGENT

INVENTOR
ANDREW T. KORNYLAK

BY Harold L. Halpert
AGENT

INVENTOR
ANDREW T. KORNYLAK

BY Harold L. Halpert
AGENT

CONVEYOR ROLLER

This invention relates to a conveyor roller and particularly to a roller for conveying a load in mutually perpendicular directions.

Conveyor rollers having the above-mentioned characteristics are disclosed in U.S. Pat. Nos. 1,123,851; 2,873,021; 3,295,700; and 3,363,735 and in a German Pat. No. 502,510. The rollers disclosed in the above-mentioned patents are mounted to be rotated in a plane normal to the axis of rotation, and carry a plurality of rollers at the periphery for rotation in said plane about axes normal to said axis. The mounting of the peripheral rollers has dictated the use of structures which are difficult and expensive to produce. It is therefore an object of this invention to produce a conveyor wheel which is simple in structure and inexpensive to produce.

It is a further object of the invention to produce a conveyor wheel as aforesaid in which there are few parts and which parts can be formed without machining operations.

It is a further object of this invention to produce a conveyor wheel as aforesaid in which the parts of the wheel can be formed by simple moulding operations.

Figure 2:
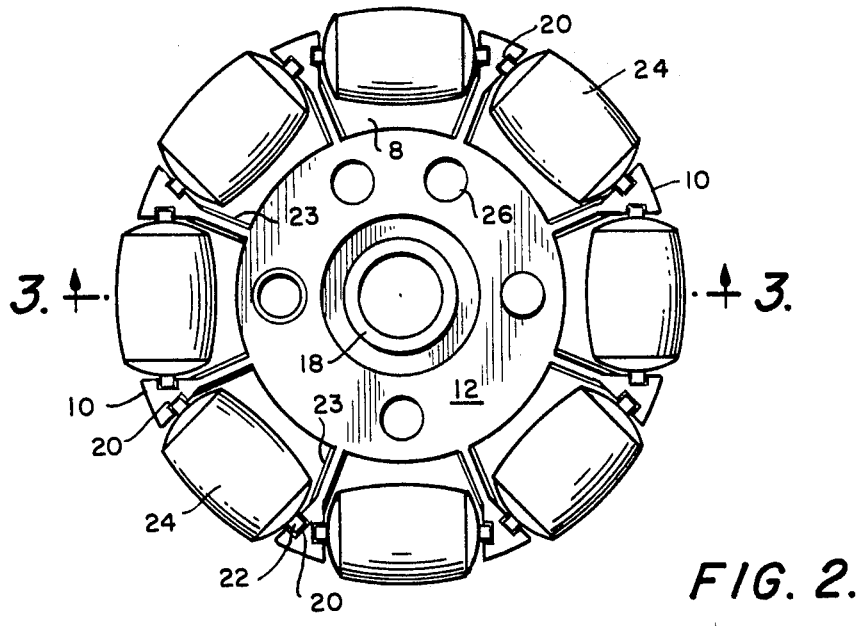
Figure 3:
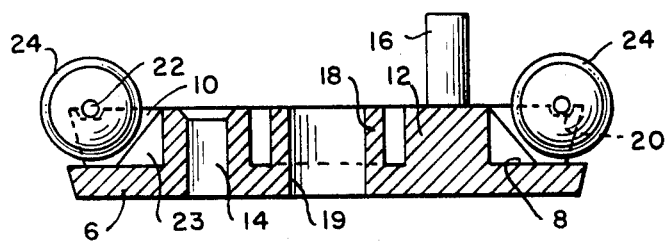
Figure 6:
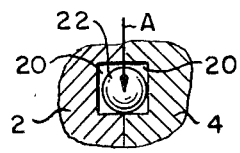
Figure 7:
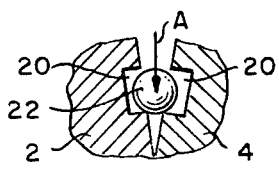
Figure 8:
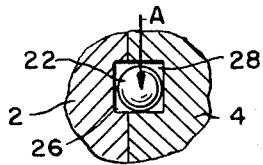
Figure 4:
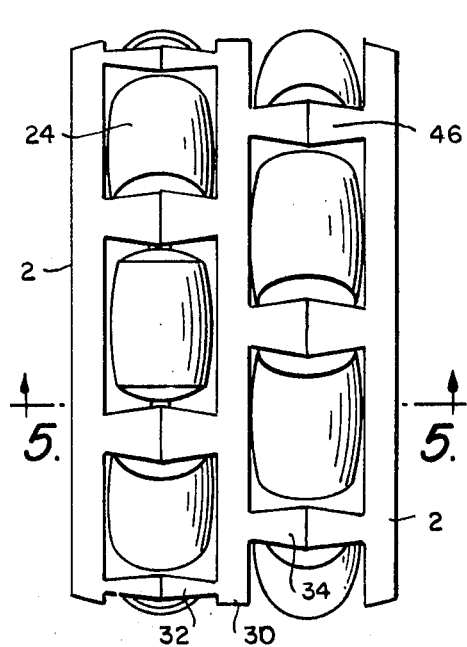
Figure 5:
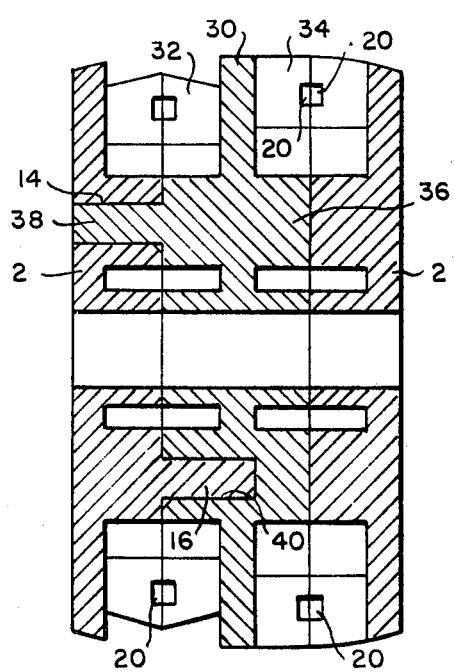
Figure 9:
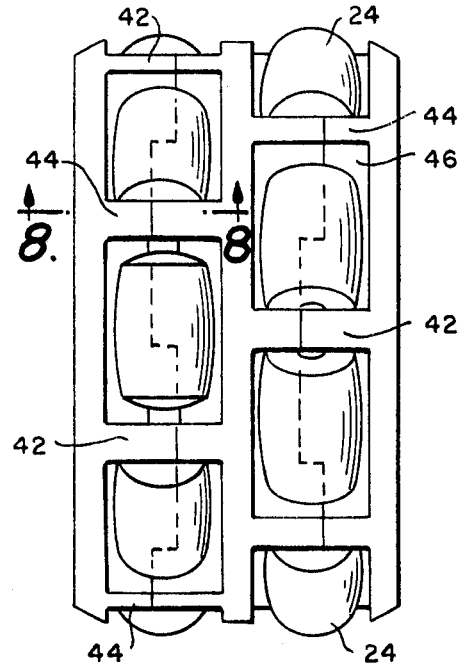
Figure 10:
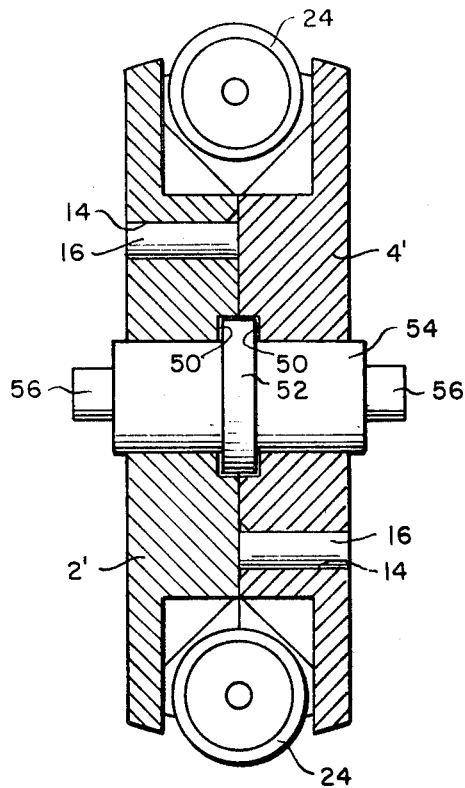
Figure 11:
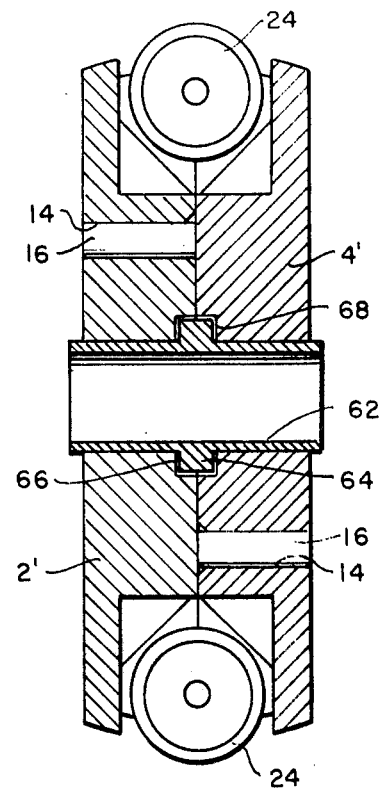
Figure 12:
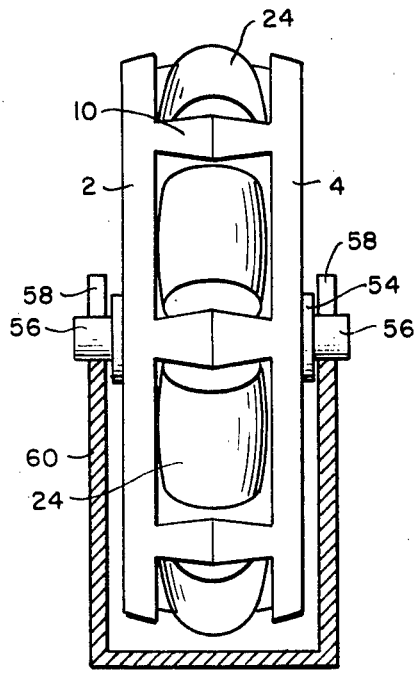

These and other objects of the invention will become manifest upon reading the following description in conjunction with the accompanying drawing wherein:

FIG. 1 is a perspective view of one form of the invention,
FIG. 2 is a section showing the mounting of the rollers,
FIG. 3 is a section taken on the line 3–3 of FIG. 2,
FIG. 4 is an elevation view of a second form of the invention,
FIG. 5 is a section taken on the line 5–5 of FIG. 4,
FIG. 6 is a view taken on line 6–6 of FIG. 1,
FIG. 7 is a view similar to FIG. 6 showing the spreading of the support members under load,
FIG. 8 is a section on line 8–8 of FIG. 9,
FIG. 9 is an elevational view of a third form of the invention,
FIG. 10 is a cross section of the wheel of this invention illustrating one form of mounting,
FIG. 11 is a cross section of the wheel of this invention illustrating another form of mounting, and
FIG. 12 is a view partly in section showing the mounting of FIG. 10 used in a channel.

With reference to FIGS. 1—3 of the drawing there is shown a conveyor wheel comprising a pair of support members 2 and 4 which are secured together to form the hub of the wheel. Each member comprises a planar section 6 having moulded on an annular surface 8 a plurality of radially extending circumferentially spaced arms 10. An annulus 12 extends from surface 8 and is formed with an opening 14 and a post 16. A second annulus 18 extends from the surface 8 and provides an aperture 19 for mounting the wheel on a shaft.

Each arm is formed with a recess 20 for forming a bearing for shaft 22 upon which is mounted a roller 24. In the form of the invention illustrated in FIGS. 1—3 the roller is rotatable on shaft 22 and the shaft is rotatable in the bearing. However, it is understood that the roller can be securely mounted on the shaft and the shaft rotatable in the bearings or the shaft securely mounted against rotation in the bearings and the roller mounted for rotation on the shaft.

The members 2 and 4 are moulded in the same mould and the faces of the members as seen in FIG. 2 are therefore congruent. Since it is preferred to form the members of a synthetic plastic it is desired to provide additional strength to the arms. The arms are therefore provided with strengthening plates 23 moulded integral with the arms and surface.

A plurality of openings 25 are formed in the annulus 12 to receive fasteners in the event that it is desired to use a plurality of wheels mounted in side by side relation. The openings are angularly spaced to permit a plurality of wheels to be joined with adjacent rollers staggered or aligned.

The rollers are also preferably formed of a synthetic plastic and can be moulded into the barrel shape illustrated.

In assembling the wheel, member 2 or 4 can be supported in a horizontal position as illustrated in FIG. 2. The rollers and shafts are mounted on the arms to form a subassembly as shown in FIG. 2 and the other of the members 2 or 4 is positioned over the subassembly with a post 16 aligned with an opening 14. The parts are then forced together to insert each post into an opening. The relative sizes of posts and openings are such as to provide a tight friction fit. If desired, a thermoplastic resin can be used to form the members and a slight amount of heat and pressure applied to the posts will produce sufficient deformation to permanently secure the parts together.

With reference to FIG. 6 there is shown a shaft 22 mounted in a bearing formed by opposed recesses 20. The load applied to the roller 24 is transmitted to the shaft and is shown as applied along the direction of the arrow A. In FIG. 7 there is illustrated in exaggerated form the effect of the load acting along the contacting edges of the bearing openings. The load operates to spread the members 2 and 4 as the load is applied. In FIG. 8 there is illustrated a form of bearing in which the spreading effect of the load is eliminated. In this form of the invention the recesses 26 and 28 which form the bearing are made of unequal width. The load applied by the shaft 22 is thus applied on an uninterrupted surface. The recesses 26 of narrower width could be formed in the arms of one of the members 2 or 4 and the recesses 28 of greater width could be formed in the arms of the other member to obtain the benefits of this form of the invention. However, by forming the wider recess in the alternate arms with the narrower recesses in the intermediate arms, both members can be identical and formed in the same mould.

In FIGS. 4 and 5 there is illustrated a form of the invention in which a central support member having a planar section 30 is formed with laterally extending arms 32, 34 similar to the arms 10. Lateral support members 2 are identical with the members 2 and 4 in the previously described embodiment of the invention. The faces on opposite sides of the central support member are congruent to the opposing faces of the lateral support members and appear as shown in FIG. 2 but are circumferentially displaced. In FIG. 4 the circumferential displacement is shown as equal to one-half the angle between adjacent arms 34. This ensures circumferential continuity of the support provided by the rollers. The central annulus 36 of the central support member is provided with posts 38 and recesses 40 on opposite faces to engage with posts and recesses 16 and 14 of members 2 to secure the parts together as illustrated in FIGS. 4 and 5 and as described with reference to FIGS. 1—3.

In the form of the invention illustrated in FIGS. 4 and 5, the load on the shafts produces the deficiency described with reference to FIG. 7. In order to avoid this fault the form of the invention shown in FIG. 9 is provided with the bearing structure of FIG. 8. The lateral support members are identical and are formed with long arms 42 and short arms 44. The bearing recesses 28 of greater width are formed in the longer arms and the bearing recesses 26 of narrower width are formed in the shorter arms. In order to provide the recesses of unequal width and to enable manufacture of the parts with the minimum number of moulds or manufacturing steps, the central support member and the lateral support members are formed with stepped portions in parallel planes. It is thus merely necessary to align the parts to form the packets 46 for the rollers and provide the proper positioning of the recesses to form the bearings.

In FIG. 10, support members 2' and 4' are similar to members 2 and 4 heretofore described but are modified to provide for mounting in a support such as a channel member. Each member is formed with a cylindrical recess 50 to receive a cylindrical flange 52 integral with a mounting shaft 54. Central openings in the support members receive the shaft for rotatably mounting the wheel thereon and this interfit of recesses 50 and flange 52 retain the wheel centrally of the shaft. The ends of the shaft are provided with trunnions 56 which are slidably received in slots 58 formed in the arms of a channel member 60 such as illustrated in FIG. 12.

In FIG. 11 there is illustrated a mounting for rotatably mounting the wheel between a pair of clamping surfaces. The mounting comprises a bushing 62 having integrally formed therewith a flange 64 received in recesses 66, 68 in the manner described with respect to flange 52 and recesses 50. The bushing extends axially beyond the wheel to receive the thrust of the clamping members and to allow free rotation of the wheel.

While it is preferred to make the hub and rollers of a synthetic plastic it is clear that the objects of the invention can be carried out by the use of metals or other materials for the hub and rollers.

I claim:

1. A conveyor wheel comprising a hub and means for mounting the hub for rotation about an axis, said hub comprising at least a pair of similar support members having contoured faces forming segments of pockets, means securing the members with the faces in contact and oriented to form complete pockets circumferentially spaced about said axis, rollers in said pockets, and means mounting the rollers for rotation about axes normal to radii from said first mentioned axis and with the cylindrical surfaces of said rollers projecting radially from the periphery of the hub.

2. A wheel as defined in claim 1 wherein each said face comprises an annular surface and circumferentially spaced radially extending arms integral with and extending from said surface.

3. A wheel as defined in claim 2 wherein the means mounting the rollers comprises bearing means in the arms of at least one member, a shaft mounted in said bearing means, and means mounting the rollers on the shafts.

4. A wheel as defined in claim 3 wherein the faces are in contact in a single plane and the bearing means comprises recesses of unequal width in the arms of the members on opposite sides of said plane.

5. A wheel as defined in claim 3 wherein the faces are in contact in a single plane and the bearing means comprises recesses of equal width in the arms of the members on opposite sides of said plane, said faces being congruent.

6. A wheel as defined in claim 3 wherein the faces are in contact in parallel planes and the bearing means comprises recesses of unequal width on the opposite sides of each said parallel plane.

7. A wheel as defined in claim 3 wherein the shafts are rotatably mounted in the bearing means and the rollers are rotatably mounted on the shafts.

8. A wheel as defined in claim 7 wherein the support members and rollers are of a synthetic plastic.

9. A wheel as defined in claim 3 wherein the sides of the rollers are curved to define a barrel shaped roller, the generator of the curve being a segment of a circle having a radius extending from said axis of rotation to a point beyond the periphery of said annular surface.

10. A wheel as defined in claim 1 wherein the means securing said members comprises an opening in one of the members and a post extending from the other member into the opening.

11. A wheel as defined in claim 1 wherein the means securing said members comprises an opening in each of said members and a post extending from each member into the opening in the other member.

12. A conveyor wheel comprising a hub and means for mounting the hub for rotation about an axis, said hub comprising a central support member having congruent faces forming segments of pockets on opposite sides of a plane perpendicular to the axis of the rotation, lateral support members having similar congruent faces secured in contact with the congruent faces of the central member and oriented thereto to form complete pockets circumferentially spaced about said axis, rollers in said pockets, and means mounting the rollers for rotation about axes normal to radii from said first mentioned axis and with the cylindrical surfaces of said rollers projecting radially from the periphery of the hub.

13. A wheel as defined in claim 12 wherein each said congruent face comprises an annular surface and circumferentially spaced radially extending arms integral with and extending from said surface.

14. A wheel as defined in claim 13 wherein the means mounting the rollers comprises bearing means in each arm, a shaft mounted in said bearing means, and means mounting the rollers on the shafts.

15. A wheel as defined in claim 14 wherein the pockets formed by a pair of congruent faces on one side of said plane is circumferentially displaced from the pockets formed by the pair of congruent faces on the other side of the plane.

16. A wheel as defined in claim 15 wherein the congruent faces on each side of said plane are in contact along a single plane and the bearing means comprises recesses of equal width in each member.

17. A wheel as defined in claim 15 wherein the congruent faces on each side of the central plane are in contact in parallel planes and the bearing means comprises recesses of unequal width in each member.

18. A wheel as defined in claim 15 wherein the support members and rollers are of a synthetic plastic.

19. A wheel as defined in claim 15 wherein the sides of the rollers are curved to define a barrel shaped roller, the generator of the curve being a segment of a circle having a radius extending from said axis of rotation to a point beyond the periphery of said annular surface.

20. A wheel as defined in claim 19 wherein the lateral support members are secured to the central member by means comprising openings in the contacting faces of said support members and projections extending from said members into said openings.

21. A wheel as defined in claim 1 wherein the mounting means comprises aligned bores in the support members, recesses in the contacting faces of said members, and a shaft having a flange rotatably mounted in said bores with the flange in said recesses.

22. A wheel as defined in claim 1 wherein the mounting means comprises aligned bores in the support members, recesses in the contacting faces of said members, and a bushing having a flange rotatably mounted in said bores with the flange in said recesses.